(12) United States Patent
Bernat et al.

(10) Patent No.: US 11,880,714 B2
(45) Date of Patent: *Jan. 23, 2024

(54) TECHNOLOGIES FOR PROVIDING DYNAMIC SELECTION OF EDGE AND LOCAL ACCELERATOR RESOURCES

(71) Applicant: Intel Corporation, Santa Clara, CA (US)

(72) Inventors: Francesc Guim Bernat, Barcelona (ES); Karthik Kumar, Chandler, AZ (US); Ned Smith, Beaverton, OR (US); Thomas Willhalm, Sandhausen (DE); Timothy Verrall, Pleasant Hill, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,592

(22) Filed: Nov. 8, 2021

(65) Prior Publication Data

US 2022/0206857 A1    Jun. 30, 2022

Related U.S. Application Data

(63) Continuation of application No. 16/236,196, filed on Dec. 28, 2018, now Pat. No. 11,169,853.

(51) Int. Cl.
*G06F 9/50* (2006.01)
*G06F 9/48* (2006.01)
(Continued)

(52) U.S. Cl.
CPC .............. *G06F 9/5027* (2013.01); *G06F 1/26* (2013.01); *G06F 1/3293* (2013.01);
(Continued)

(58) Field of Classification Search
CPC ........ G06F 9/48; G06F 9/4806; G06F 9/4843; G06F 9/485; G06F 9/4856; G06F 9/4881;
(Continued)

(56) References Cited

U.S. PATENT DOCUMENTS 10,440,096 B2   10/2019  Sabella et al.
11,169,853 B2   11/2021  Bernat et al.
(Continued)

FOREIGN PATENT DOCUMENTS

WO    2017/066936 A1    4/2017

OTHER PUBLICATIONS

Lyu et al, "Selective Offloading in Mobile Edge Computing for the Green Internet of Things", IEEE Network, Jan./Feb. 2018, pp. 54-60 (Year: 2018).*

(Continued)

*Primary Examiner* — Charles M Swift
(74) *Attorney, Agent, or Firm* — HANLEY, FLIGHT & ZIMMERMAN, LLC

(57) ABSTRACT

Technologies for providing dynamic selection of edge and local accelerator resources includes a device having circuitry to identify a function of an application to be accelerated, determine one or more properties of an accelerator resource available at the edge of a network where the device is located, and determine one or more properties of an accelerator resource available in the device. Additionally, the circuitry is to determine a set of acceleration selection factors associated with the function, wherein the acceleration factors are indicative of one or more objectives to be satisfied in the acceleration of the function. Further, the circuitry is to select, as a function of the one or more properties of the accelerator resource available at the edge, the one or more properties of the accelerator resource available in the device, and the acceleration selection fac- (Continued)

tors, one or more of the accelerator resources to accelerate the function.

25 Claims, 6 Drawing Sheets

(51) Int. Cl.
*G06F 9/54* (2006.01)
*G06F 1/26* (2006.01)
*G06F 9/455* (2018.01)
*G06F 1/3293* (2019.01)

(52) U.S. Cl.
CPC ............ *G06F 9/45558* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4881* (2013.01); *G06F 9/4893* (2013.01); *G06F 9/50* (2013.01); *G06F 9/5005* (2013.01); *G06F 9/505* (2013.01); *G06F 9/5044* (2013.01); *G06F 9/5055* (2013.01); *G06F 9/5061* (2013.01); *G06F 9/5072* (2013.01); *G06F 9/5094* (2013.01); *G06F 9/54* (2013.01); *G06F 9/547* (2013.01); *G06F 2009/45595* (2013.01)

(58) Field of Classification Search
CPC ........ G06F 9/4893; G06F 9/50; G06F 9/5005; G06F 9/5027; G06F 9/5044; G06F 9/5061; G06F 9/5072; G06F 9/5094; G06F 9/54; G06F 9/547; G06F 2009/45595; G06F 1/26
See application file for complete search history.

(56) References Cited

U.S. PATENT DOCUMENTS

| | | |
|---|---|---|
| 2013/0297793 A1 | 11/2013 | Lord et al. |
| 2014/0189862 A1 | 7/2014 | Kruglick |
| 2015/0288619 A1 | 10/2015 | Fritsch |
| 2015/0339059 A1 | 11/2015 | Kang et al. |
| 2016/0269927 A1 | 9/2016 | Kim et al. |
| 2016/0306674 A1 | 10/2016 | Chiou et al. |
| 2016/0364271 A1 | 12/2016 | Burger et al. |
| 2017/0270043 A1 | 9/2017 | Chung et al. |
| 2018/0183855 A1 | 6/2018 | Sabella et al. |
| 2018/0246768 A1 | 8/2018 | Palermo et al. |
| 2019/0044886 A1 | 2/2019 | Bernat et al. |
| 2019/0129744 A1 | 5/2019 | Nye et al. |
| 2019/0138361 A1 | 5/2019 | Bernat et al. |
| 2019/0384654 A1 | 12/2019 | Schardt et al. |
| 2020/0159586 A1* | 5/2020 | Chandramoorthy .. G06F 9/4806 |

OTHER PUBLICATIONS

United States Patent and Trademark Office, "Notice of Allowance and Fee(s) Due," issued in connection with U.S. Appl. No. 16/236,196, dated Jul. 6, 2021, 8 pages.

United States Patent and Trademark Office, "Notice of Allowance and Fee(s) Due," issued in connection with U.S. Appl. No. 16/236,196, dated Feb. 25, 2021, 9 pages.

United States Patent and Trademark Office, "Final Rejection," issued in connection with U.S. Appl. No. 16/236,196, dated Sep. 21, 2020, 24 pages.

United States Patent and Trademark Office, "Non-Final Rejection," issued in connection with U.S. Appl. No. 16/236,196, dated Jun. 23, 2020, 22 pages.

Kuo et al., "An Integrated Edge and Fog System for Future Communication Networks," 2018 IEEE Wireless Communications and Networking Conference, Apr. 15-18, 2018, IEEE, 8 pages.

NVIDIA, "NVIDIA Jetson Xavier System-on-Module," Data Sheet [Preliminary], Aug. 28, 2018, 71 pages.

Chen et al., "Efficient Multi-User Computation Offloading for Mobile-Edge Cloud Computing," arXiv:1510.00888v1 [cs.NI], [https://doi.org/10.48550/arXiv.1510.00888], Oct. 4, 2015, 14 pages.

Zhang et al., "A Survey on Emerging Computing Paradigms for Big Data," Chinese Journal of Electronics, vol. 26, No. 1, Jan. 2017, 12 pages.

Lyu et al., "Adaptive Receding Horizon Offloading Strategy Under Dynamic Environment," IEEE Communications Letters, vol. 20, No. 5, May 2016, 4 pages.

Yu et al., "Cooperative Resource Management in Cloud-Enabled Vehicular Networks," IEEE Transactions on Industrial Electronics, vol. 62, No. 12, Dec. 2015, 14 pages.

Yu et al., "Decentralized and Optimal Resource Cooperation in Geo-Distributed Mobile Cloud Computing," IEEE Transactions on Emerging Topics in Computing, Mar. 2, 2018, 13 pages.

Ren et al., "Exploiting Mobile Crowdsourcing for Pervasive Cloud Services: Challenges and Solutions," IEEE Communications Magazine, Mar. 2015, 8 pages.

Kao et al., "Hermes: Latency Optimal Task Assignment for Resource-constrained Mobile Computing," IEEE, 2017, 14 pages.

Labidi et al., "Joint Multi-user Resource Scheduling and Computation Offloading in Small Cell Networks," IEEE 11th International Conference on Wireless and Mobile Computing, Networking and Communications (WiMob), 2015, 8 pages.

Patel et al., "Mobile-Edge Computing," Introductory Technical White Paper, Issue 1, Sep. 2014, 36 pages.

Lyu et al., "Multiuser Joint Task Offloading and Resource Optimization in Proximate Clouds," IEEE Transactions on Vehicular Technology, vol. 66, No. 4, Apr. 2017, 13 pages.

Chen et al., "Optimal Quality of-Service Scheduling for Energy-Harvesting Powered Wireless Communications," IEEE Transactions on Wireless Communications, vol. 15, No. 5, May 2016, 12 pages.

Lyu et al., "Optimal Schedule of Mobile Edge Computing for Internet of Things Using Partial Information," IEEE Journal on Selected Areas in Communications, vol. 35, No. 11, Nov. 2017, 10 pages.

Wu et al., "Secrecy-Based Energy-Efficient Data Offloading via Dual Connectivity Over Unlicensed Spectrums," IEEE Journal on Selected Areas in Communications, vol. 34, No. 12, Dec. 2016, 19 pages.

Ren et al., "Serving at the Edge: A Scalable IoT Architecture Based on Transparent Computing," IEEE Network, Sep./Oct. 2017, 10 pages.

Ortiz et al., "The Cluster Between Internet of Things and Social Networks: Review and Research Challenges," IEEE Internet of Things Journal, vol. 1, No. 3, Jun. 2014, 10 pages.

\* cited by examiner

TECHNOLOGIES FOR PROVIDING DYNAMIC SELECTION OF EDGE AND LOCAL ACCELERATOR RESOURCES

RELATED APPLICATION

This patent arises from a continuation of U.S. patent application Ser. No. 16/236,196, (now U.S. Pat. No. 11,169,853) which was filed on Dec. 28, 2018. U.S. patent application Ser. No. 16/236,196 is hereby incorporated herein by reference in its entirety. Priority to U.S. patent application Ser. No. 16/236,196 is hereby claimed.

BACKGROUND

In an application executed by a compute device, certain functions may benefit from being executed by an accelerator device (e.g., any device capable of executing a set of operations faster than the general purpose processor) because a general purpose processor may be unable to execute the function fast enough for the results of the function to be usable (e.g., to identify a pedestrian in a street and stop a vehicle). Often, a compute device is equipped with one or more accelerator devices to accelerate such functions. However, due to changing circumstances of the compute device (e.g., depletion of the battery), in may be infeasible to utilize an accelerator device present in the compute device (e.g., because the accelerator device is not as power efficient as the general purpose processor).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
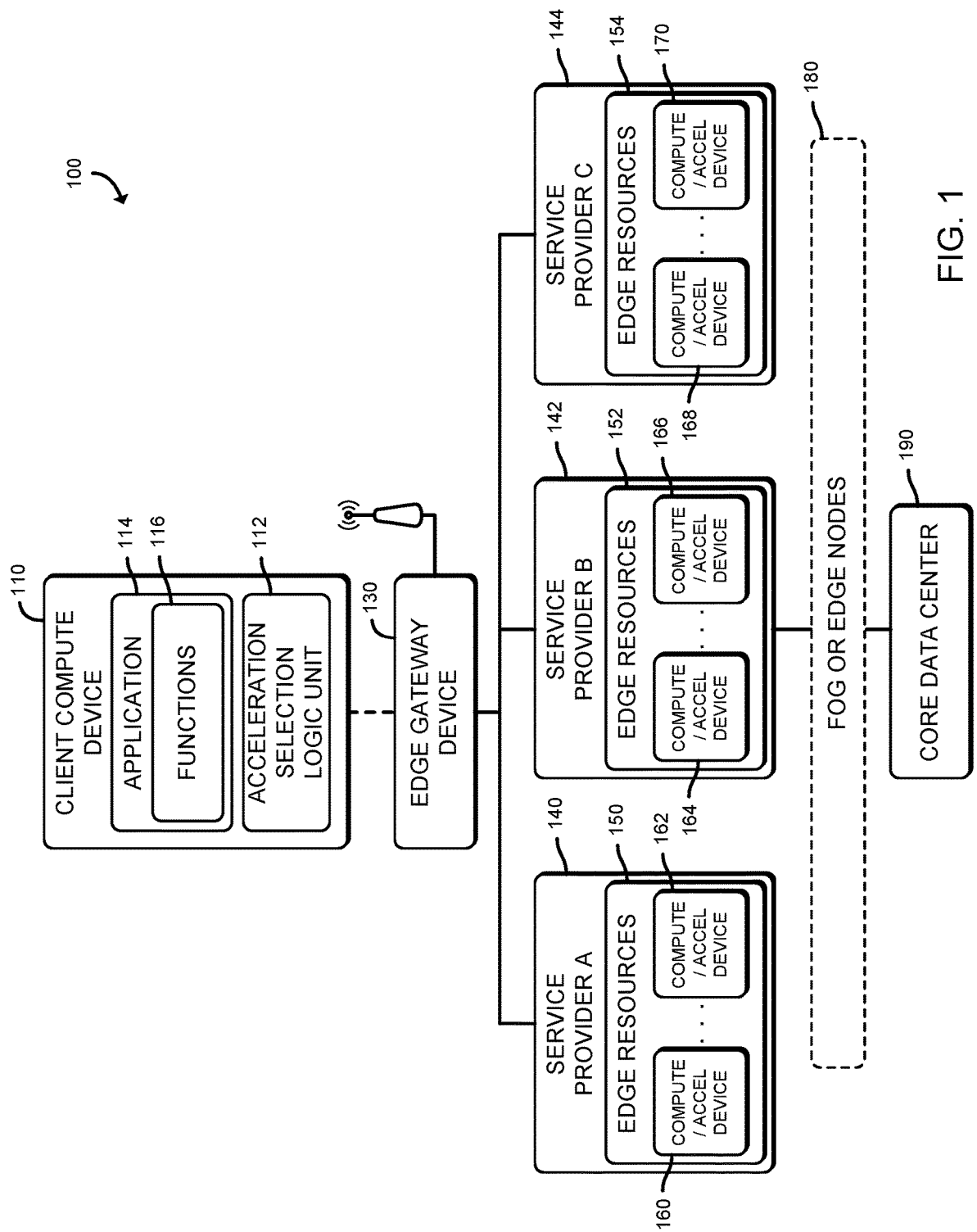
FIG. 1 is a simplified diagram of at least one embodiment of a system for providing dynamic selection of edge and local accelerator resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for providing dynamic selection of edge and local accelerator resources to accelerate one or more functions includes a client compute device 110 in communication with an edge gateway device 130. The edge gateway device 130 may be embodied as any device capable of communicating data between the client compute device 110 and one or more edge resources 150, 152, 154 (e.g., resources, such as compute devices and the components thereof (e.g., accelerator devices) 160, 162, 164, 166, 168, 170, owned and/or operated by one or more service providers, such as cellular network operators) or other compute devices located in a cloud. Further, the edge gateway device 130, in the illustrative embodiment, is configured to receive and respond to requests (e.g., queries)

from the client compute device 110 for a list of available accelerator resources (e.g., accelerator devices) and properties of those accelerator resources, such as latencies, power usage, costs for using the accelerator resources, and security features associated with the accelerator resources. The edge gateway device 130 and the edge resources 150, 152, 154, in the illustrative embodiment, are positioned at one or more locations (e.g., in small cell(s), base station(s), etc.) along the edge (e.g., in an edge network) of a cloud.

An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. It should be appreciated that, in some embodiments, the edge network may form a portion of or otherwise provide an ingress point into a fog network (e.g., fog nodes 180), which may be embodied as a system-level horizontal architecture that distributes resources and services of computing, storage, control and networking anywhere between a core data center 190 (e.g., a data center that is further away from and in a higher level of a hierarchy of the system 100 than the edge resources 150, 152, 154, and that includes multiple compute devices capable of executing one or more services (e.g., processes on behalf of one or more clients)) and an endpoint device (e.g., the client compute device 110).

As discussed in more detail herein, the client compute device 110, in operation, executes an application 114 (e.g., using a processor and/or accelerator device(s)) included in the client compute device 110. The application 114 includes multiple functions 116, some of which may benefit from acceleration (e.g., to provide a result within a time period that would be difficult to satisfy if the function were executed by the general purpose processor). Further, in the illustrative embodiment, the client compute device 110 includes an acceleration selection logic unit 112, which may be embodied as any device or circuitry (e.g., a processor, an application specific integrated circuit (ASIC), reconfigurable circuitry, etc.) configured to determine the available accelerator resources at the edge and properties of those accelerator resources (e.g., by querying the edge gateway device 130), determine corresponding properties of any accelerator resources present in the client compute device 110, compare the properties of the accelerator resource at the edge and those local to the client compute device 110 to a set of acceleration selection factors (e.g., objectives to be satisfied in the acceleration of the function), and select, based on the comparison, one or more accelerator resources (e.g., at the edge or included in the client compute device 110) to accelerate (e.g., execute) the function (e.g., to provide the greatest degree of satisfaction of the acceleration selection factors).

Figure 2:
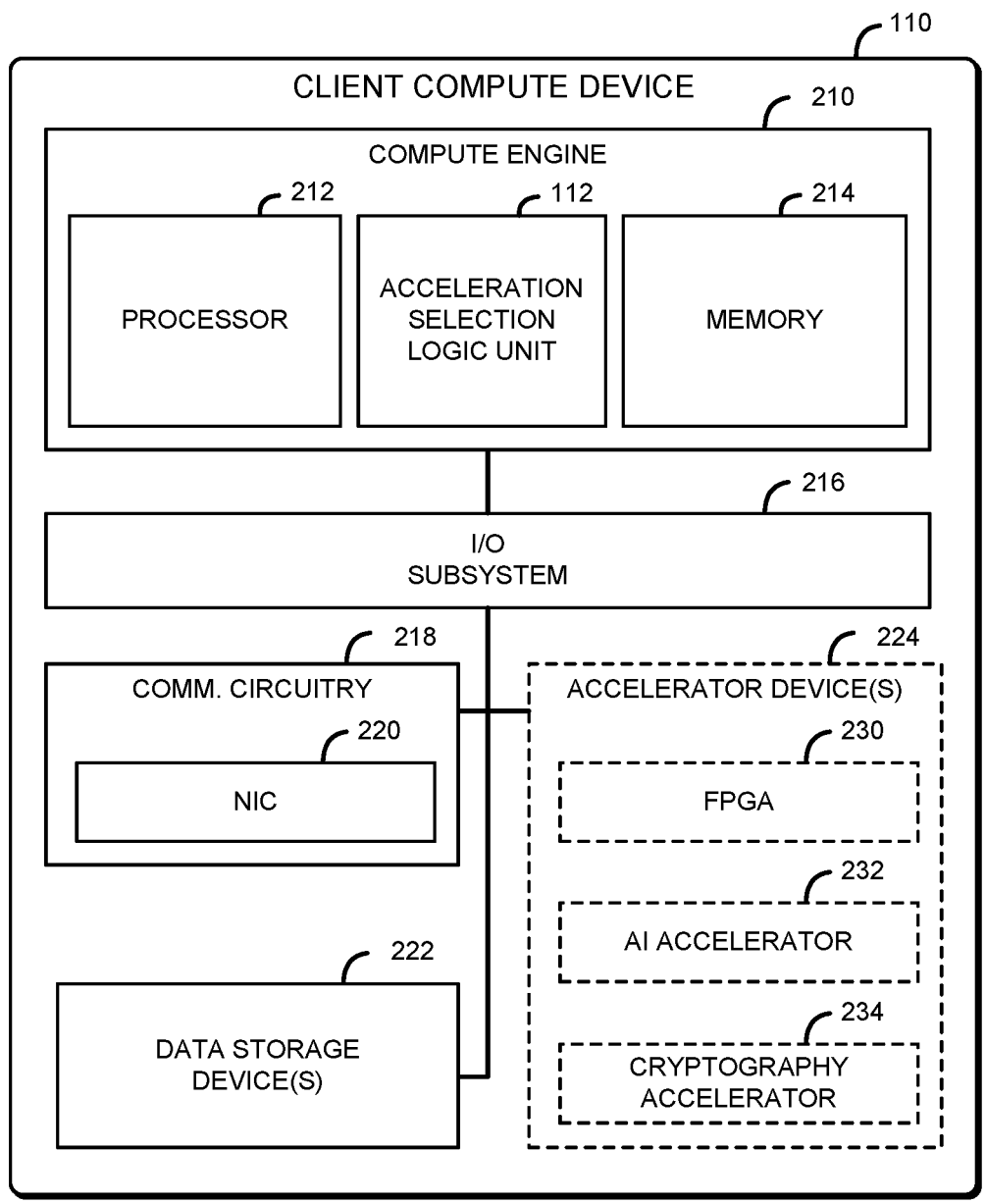
FIG. 2 is a simplified block diagram of at least one embodiment of a client compute device included in the system of FIG. 1.

Referring now to FIG. 2, the illustrative client compute device 110 includes a compute engine (also referred to herein as "compute engine circuitry") 210, an input/output (I/O) subsystem 216, communication circuitry 218, and one or more data storage devices 222. As described herein, the client compute device 110 may also include one or more accelerator devices 224. Of course, in other embodiments, the client compute device 110 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212, a memory 214, and the acceleration selection logic unit 112, described above with reference to FIG. 1. The processor 212 may be embodied as any type of processor capable of performing the functions described herein (e.g., executing the application 114). For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as one or more applications (the application 114), data operated on by the application(s), libraries, and drivers.

The compute engine 210 is communicatively coupled to other components of the client compute device 110 via the I/O subsystem 216, which may be embodied as circuitry and/or components to facilitate input/output operations with the compute engine 210 (e.g., with the processor 212 and/or the main memory 214) and other components of the client compute device 110. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the client compute device 110, into the compute engine 210.

The communication circuitry 218 may be embodied as any communication circuit, device, or collection thereof, capable of enabling communications over a network between the client compute device 110 and another compute device (e.g., the edge gateway device 130, the edge resources 150, 152, 154, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the client compute device 110 to connect with another compute device (e.g., the edge gateway device 130, the edge resources 150, 152, 154, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the client compute device 110 at the board level, socket level, chip level, and/or other levels.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

Each accelerator device(s) 224 may be embodied as any device(s) or circuitries configured to execute a set of operations faster than the processor 212 is capable of executing the operations. The accelerator device(s) 224 may include one or more field programmable gate arrays (FPGAs) 230, each of which may be embodied as a set (e.g., a matrix) of logic gates that can be configured to perform a set of operations according to a defined configuration (e.g., a bit stream). The accelerator device(s) 224 may additionally or alternatively include an artificial intelligence accelerator 232, which may be embodied as which may be embodied as any device or circuitry (e.g., a programmable logic chip, a processor, etc.) configured to perform artificial intelligence related operations (e.g., matrix multiplication, vector operations, machine learning training operations, machine learning inference operations, etc.). Additionally or alternatively, the accelerator device(s) 224 may include a cryptography accelerator 234, which may be embodied, which may be embodied as any device or circuitry (e.g., a programmable logic chip, a processor, etc.) configured to perform operations related to cryptographic operations (e.g., data encryption, data decryption, identity authentication, etc.). Additionally or alternatively the accelerator device(s) 224 may include other types of devices, such as one or more application specific integrated circuits (ASICs).

The edge resources 150, 152, 154 (e.g., the compute devices 160, 162, 164, 166, 168, 170), the edge gateway device 130, the fog nodes 180, and the core data center 190 may have components similar to those described in FIG. 2 with reference to the client compute device 110. The description of those components of the client compute device 110 is equally applicable to the description of components of the edge resources 150, 152, 154 (e.g., the compute devices 160, 162, 164, 166, 168, 170), the edge gateway device 130, the fog nodes 180, and the core data center 190, with the exception that, in some embodiments, the acceleration selection logic unit 112 is not included in devices other than the client compute device 110. Further, it should be appreciated that any of the edge resources 150, 152, 154 (e.g., the compute devices 160, 162, 164, 166, 168, 170), the edge gateway device 130, the fog nodes 180, and the core data center 190 may include other components, sub-components, and devices commonly found in a computing device, which are not discussed above in reference to the client compute device 110 and not discussed herein for clarity of the description. Further, it should be understood that one or more components of a compute device may be distributed across any distance, and are not necessarily housed in the same physical unit.

The client compute device 110, edge resources 150, 152, 154 (e.g., the compute devices 160, 162, 164, 166, 168, 170), the edge gateway device 130, the fog nodes 180, and the core data center 190 are illustratively in communication via a network, which may be embodied as any type of wired or wireless communication network, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Figure 3:
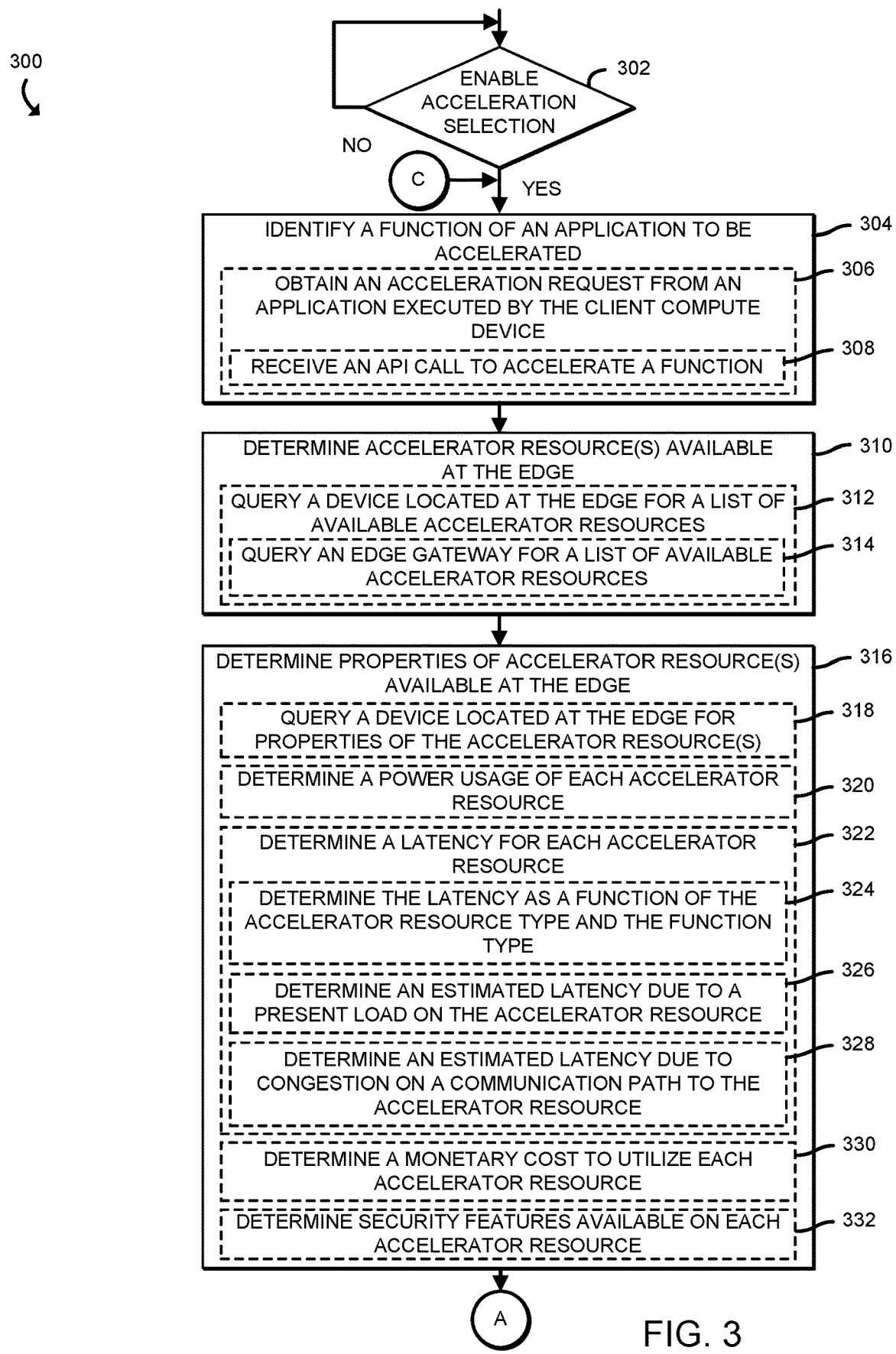
FIG. 3-5 are a simplified block diagram of at least one embodiment of a method for providing dynamic selection of edge and local accelerator resources that may be performed by a client compute device of FIG. 1.

Referring now to FIG. 3, the client compute device 110, in operation, may execute a method 300 for performing dynamic selection of edge and local accelerator resources (e.g., to accelerate one or more functions 116 of the application 114). The method 300 begins with block 302 in which the client compute device 110 determines whether to enable acceleration selection. In doing so, the client compute device 110 may determine to enable dynamic selection of edge and local accelerator resources in response to a determination that the client compute device 110 is equipped with the acceleration selection logic unit 112. In other embodiments, the client compute device 110 may make the determination based on other factors. Regardless, in response to a determination to enable dynamic selection of edge and local accelerator resources, the method 300 advances to block 304, in which the client compute device 110 identifies a function of an application (e.g., the application 114) to be accelerated (e.g., executed by an accelerator resource). In doing so, the client compute device 110 may obtain an acceleration request from an application (e.g., the application 114) executed by the client compute device 110, as indicated in block 306. For example, and as indicated in block 308, the client compute device 110 may receive an application programming interface (API) call to accelerate a function 116.

Still referring to FIG. 3, the client compute device 110 subsequently determines accelerator resources available at the edge, as indicated in block 310. In doing so, the client compute device 110 may query a device located at the edge for a list of available accelerator resources, as indicated in block 312. For example, and as indicated in block 314, the client compute device 110 may query the edge gateway device 130 for a list of available accelerator resources (e.g., accelerator devices 224 included in the compute devices 160, 162, 164, 166, 168, 170). As indicated in block 316, the client compute device 110 additionally determines properties of the accelerator resources available at the edge (e.g., the accelerator resources determined in block 310). In doing so, and as indicated in block 318, the client compute device 110 may query a device located at the edge (e.g., the edge gateway device 130) for properties of the accelerator resources (e.g., one or more accelerator devices 224 of the compute devices 160, 162, 164, 166, 168, 170) that are available. In determining, the properties, the client compute device 110 may determine a power usage (e.g., Watts per unit of time) of each accelerator resource, as indicated in block 320. Additionally or alternatively, the client compute device 110 may determine a latency for each accelerator resource, as indicated in block 322. In doing so, the client compute device 110 may determine the latency as a function of the accelerator resource type (e.g., the architecture, the instruction set supported, and/or other features that may enable the accelerator device to perform a particular type of function, such as a machine-learning function, a cryptographic function, etc. faster than another type of function) and the type of the function 116 to be accelerated, as indicated in block 324. As indicated in block 326, the client compute device 110 may determine an estimated latency due to a present load on the accelerator resource (e.g., a theoretical latency based on a number of operations per second that the accelerator resource is capable of performing, plus a delay due to an amount of operations per second that the accelerator resource is presently performing to execute another function). Additionally, the client compute device 110 may determine the estimated latency based on congestion on a communication path to the accelerator resource (e.g., add a time period for data to be sent to the accelerator resource through the network and for output data from the accelerator resource to be sent back to the client compute device 110), as indicated in block 328. The client compute device 110 may additionally determine a monetary cost to utilize each accelerator resource (e.g., a price per operation or per unit of time that may be set by an owner or operator of the accelerator resource, such as a service provider 140, 142, 144), as indicated in block 330. Further, the client compute device 110 may determine security features available for each accelerator resource, as indicated in block 332. For example, an accelerator resource may be capable of executing a function in a secure execution environment and/or offer other security features, such as Intel Quick Assist technology (QAT), Intel Security and Manageability Engine (CSME), a Trusted Platform Module (TPM), security modes such as virtualization, SGX, ARM TrustZone, and the like.

Figure 4:
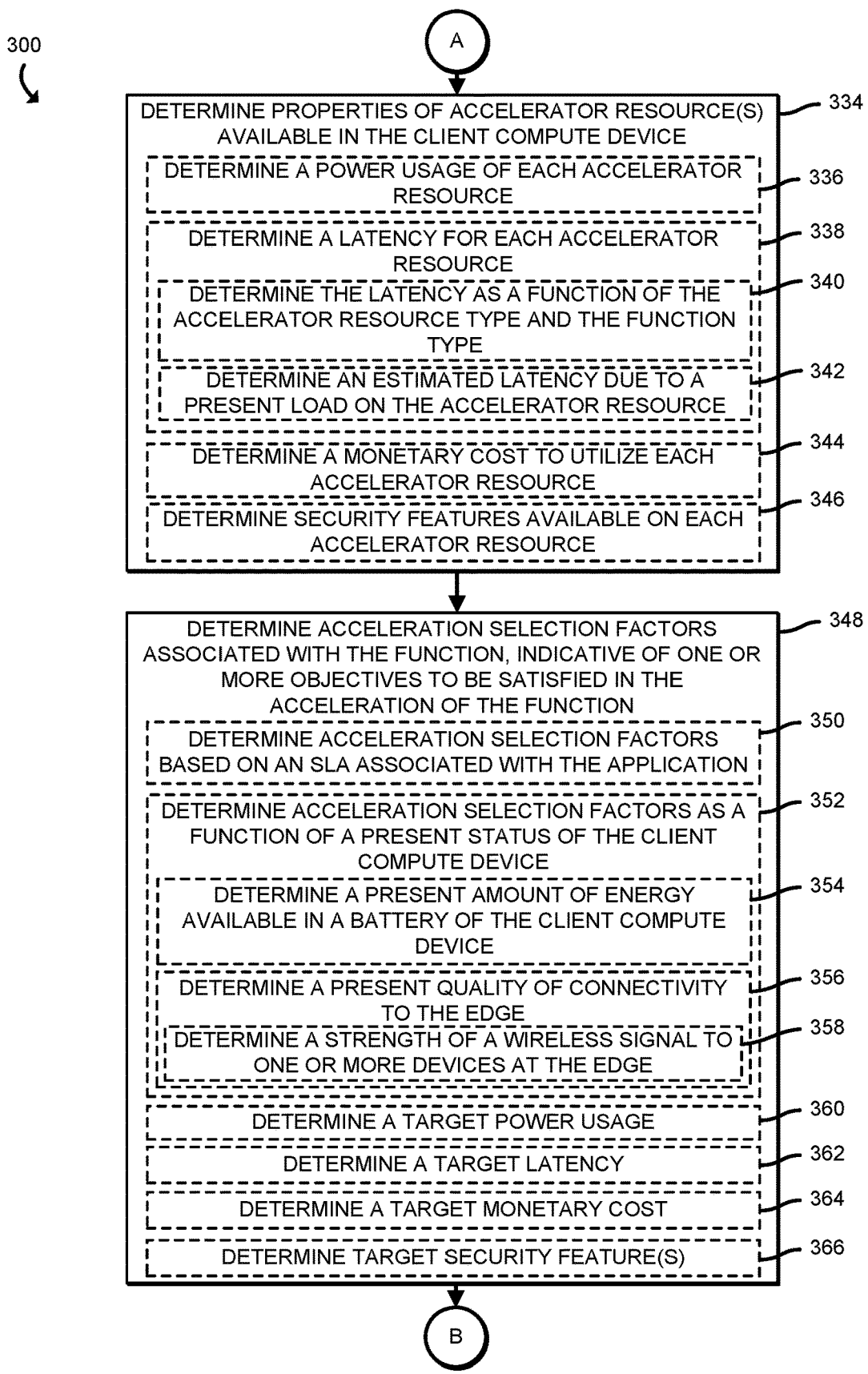

Subsequently, the method 300 advances to block 334 of FIG. 4, in which the client compute device 110 determines properties of the accelerator resources (e.g., accelerator devices 224) available in the client compute device 110. In doing so, the client compute device 110 may determine a power usage of each accelerator resource (e.g., by analyzing a log file of power usage of the accelerator resource over time), as indicated in block 336. Additionally or alternatively, the client compute device 110 may determine a latency for each accelerator resource (e.g., each accelerator device 224), as indicated in block 338. In doing so, and as indicated in block 340, the client compute device 110 may determine the latency as a function of the accelerator resource type and the type of the function to be executed, similar to block 324 of FIG. 3. As indicated in block 342, the client compute device 110 may additionally determine an estimated latency due a present load on the accelerator resource, similar to the estimation performed in block 326 of FIG. 4. Additionally, the client compute device 110 may determine a monetary cost to utilize each accelerator resource (e.g., each accelerator device 224), as indicated in block 344. In the illustrative embodiment, the client compute device 110 may set the monetary cost in an inverse relationship to an amount of stored energy (e.g., in a battery) that is available to the client compute device 110 (e.g., the lower the amount of stored energy, the higher the monetary cost). As indicated in block 346, the client compute device 110 may determine security features available for each local accelerator resource, similar to block 332. However, in doing so, the client compute device 110 may account for the fact that the client compute device 110 is not integrated into the infrastructure of any of the service providers 140, 142, 144 and, as such, may provide security even without specific security-related hardware.

Subsequently, and as indicated in block 348, the client compute device 110 determines acceleration selection factors associated with the function 116. The acceleration selection factors are indicative of one or more objectives to be satisfied (e.g., met) in the acceleration of the function 116. In doing so, and as indicated in block 350, the client compute device 110 may determine the acceleration selection factors based on a service level agreement (SLA) associated with the application 114 (e.g., a set of terms that define a quality of service, such as a latency, a cost, security features, etc. to be provided to a customer for whom the application 114 is being executed). As indicated in block 352, the client compute device 110 may determine acceleration selection factors as a function of a present status of the client compute device 110. For example, and as indicated in block 354, the client compute device 110 may determine a present amount of energy available in a battery of the client compute device 110 (e.g., in which case, the target power usage may be relatively low). As another example, the client compute device 110 may determine a present quality of connectivity to the edge (e.g., to the resources 150, 152, 154), as indicated in block 356. In doing so, in the illustrative embodiment, the client compute device 110 may determine a strength of a wireless signal to one or more devices 130, 160, 162, 164, 166, 168, 170 at the edge. With a lower quality connection (e.g., a weak, low bandwidth wireless signal), the client compute device 110 may prioritize (e.g., set a weight in favor of) performing the acceleration on the client compute device 110 rather than risking incurring additional latency due to dropped or delayed output from an accelerator resource at the edge. The client compute device 110 may determine a target power usage, as indicated in block 360, a target latency, as indicated in block 362, a target monetary cost, as indicated in block 364, and/or one or more target security features, as indicated in block 366. Subsequently, the method 300 advances to block 368 of FIG. 5, in which the client compute device 110 selects, as a function of the properties of the accelerator resources available at the edge (e.g., from block 316 of FIG. 3), the properties of the local accelerator resources (e.g., the accelerator devices 224 of the client compute device 110, determined in block 334 of FIG. 4), and the accelerator selection factor(s) (e.g., from block 348 of FIG. 4), one or more accelerator resources to accelerate (e.g., execute) the function 116.

Figure 5:
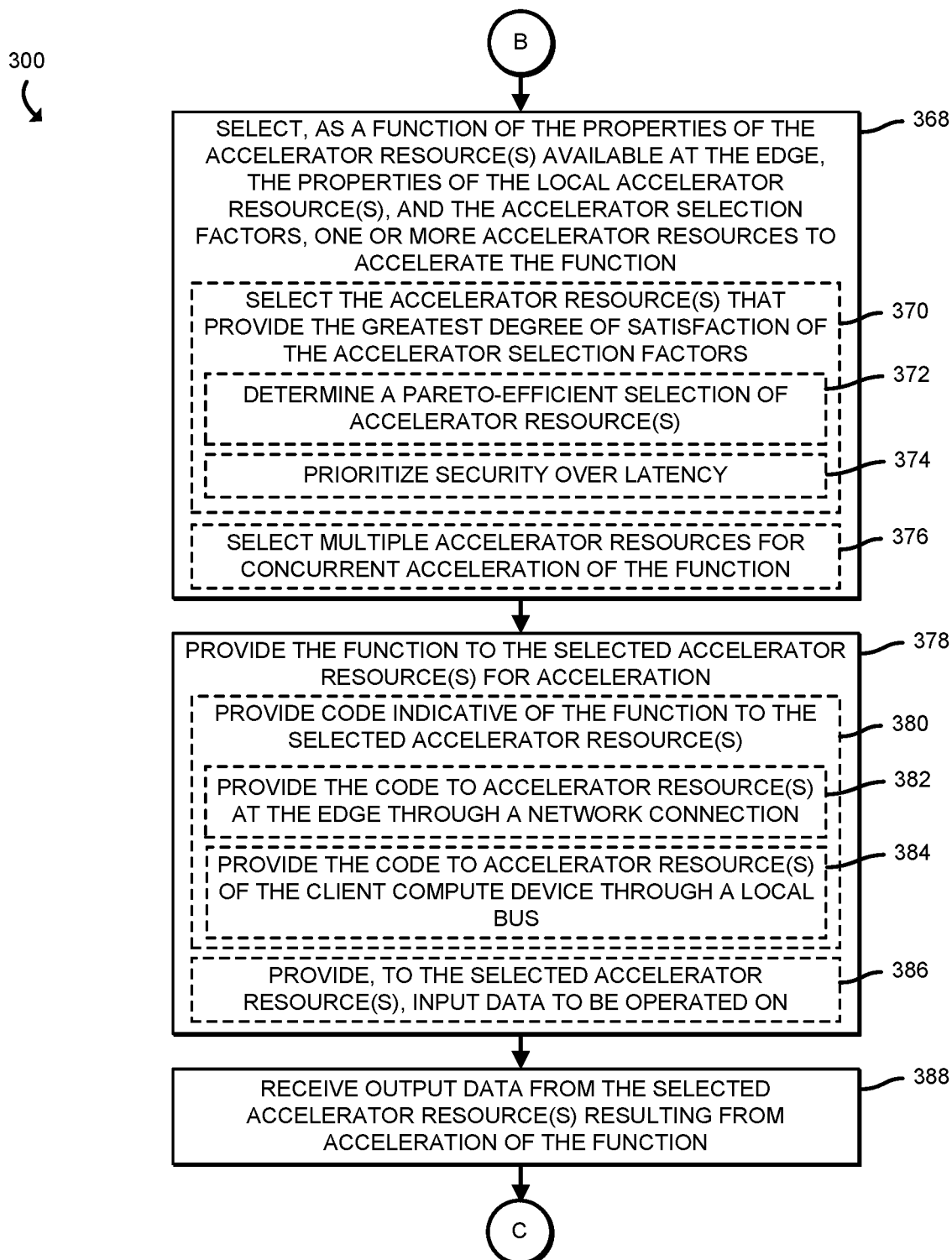

Referring now to FIG. 5, in selecting one or more accelerator resources to accelerate the function 116, the client compute device 110, in the illustrative embodiment, selects the accelerator resource(s) that provide the greatest degree of satisfaction of the accelerator selection factors (e.g., if the accelerator selection factor is to prioritize latency, the client compute device 110 selects the fastest accelerator resource (e.g., lowest latency)), as indicated in block 370. In doing so, the client compute device 110 may determine a Pareto-efficient selection of accelerator resource(s), as indicated in block 372. In other words, the client compute device 110 may determine a state of allocation of resources (e.g., selection of accelerator resource(s)) from which it is impossible to reallocate so as to make any one preference criterion (e.g., an accelerator selection factor) better off without making at least one other preference criterion (e.g., another accelerator selection factor) worse off In some embodiments, the client compute device 110, in making the selection, may prioritize security over latency (e.g., if the function cannot be performed with a certain security feature on a faster accelerator resource, the client compute device 110 may select a slower accelerator resource where the security feature is available), as indicated in block 374. In some embodiments, the client compute device 110 may select multiple accelerator resources for concurrent acceleration of the function 116 (e.g., by splitting the function 116 into multiple parts to be executed simultaneously), as indicated in block 376.

As indicated in block 378, the client compute device 110 subsequently provides the function 116 to the selected accelerator resource(s) for acceleration. In doing so, and as indicated in block 380, the client compute device 110 may provide, to the selected accelerator resource(s), code (e.g., executable code, a bitstream, etc.) indicative of (e.g., defining) the function 116, as indicated in block 380. For example, and as indicated in block 382, the client compute device 110 may provide the code to accelerator resource(s) (e.g., one or more accelerator devices 224 of the compute devices 160, 162, 164, 166, 168, 170) at the edge through a network connection (e.g., through a wireless network connection). Additionally or alternatively, the client compute device 110 may provide the code to accelerator resource(s) of the client compute device 110 (e.g., one or more accelerator devices 224 of the client compute device 110) through a local bus (e.g., Peripheral Component Interconnect express (PCIe), etc.), as indicated in block 384. The client compute device 110 may additionally provide, to the selected accelerator resource(s), input data (e.g., sensor data, image data, etc.) to be operated on (e.g., to perform the function 116 on), as indicated in block 386. Subsequently, the client compute device 110 may receive output data from the selected accelerator resource(s) (e.g., data resulting from acceleration of the function 116 by the selected accelerator resource(s)), such as a name or other identifier of an object represented in the input data, a decision on how to control a vehicle (e.g., stop the vehicle) in which the client compute device 110 is located, etc. Subsequently, the method 300 loops back to block 304 of FIG. 3, in which the client compute device 110 potentially identifies another function 116 to be accelerated.

Figure 6:
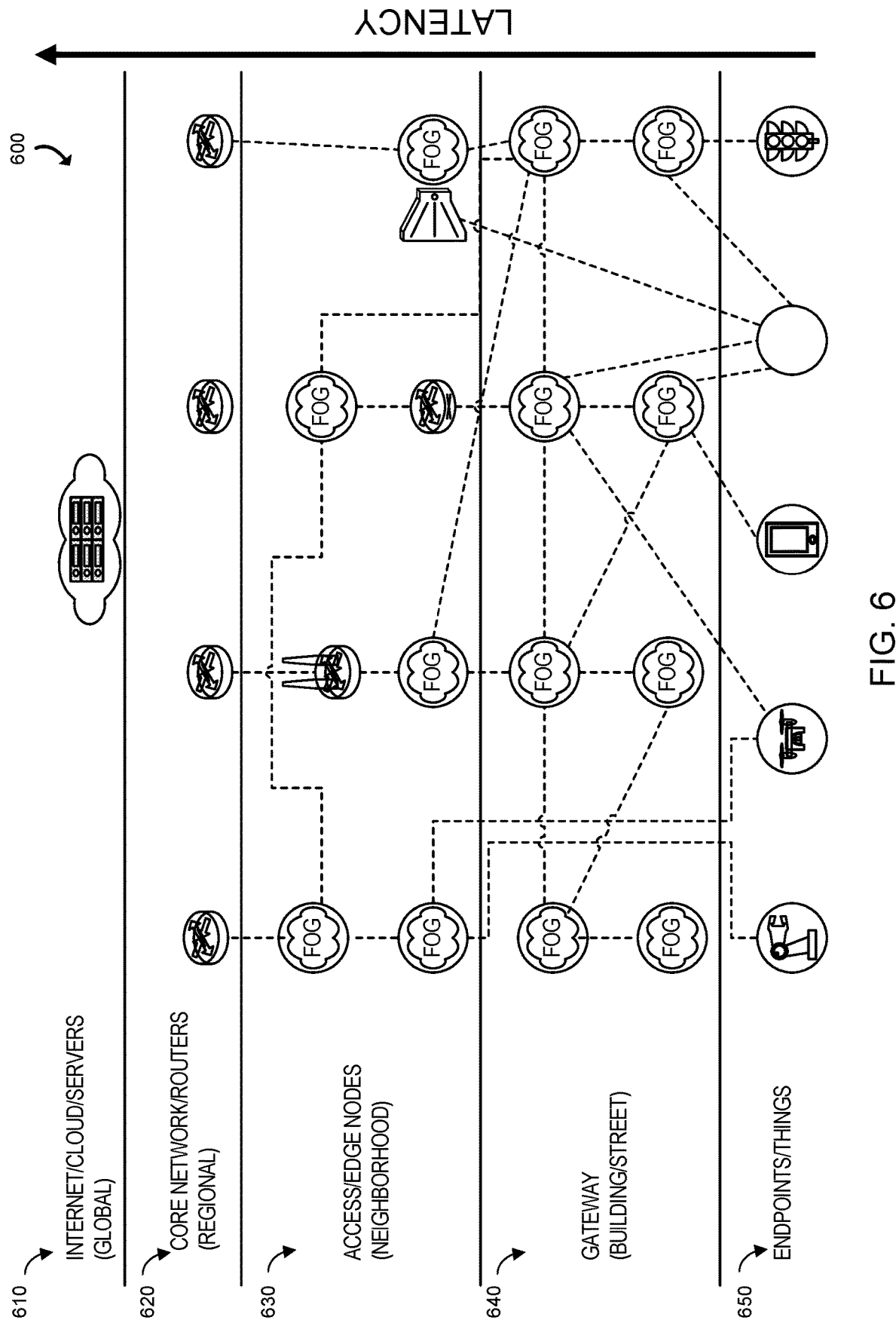
FIG. 6 is a simplified block diagram of a fog and mobile edge computing (MEC) network topology that may be utilized with the system of FIG. 1.

Referring briefly to FIG. 6, a MEC and fog network topology 600 is shown. The network topology 600 includes endpoints (at an endpoints/things network layer 650), gateways (at a gateway layer 640), access or edge computing nodes (e.g., at neighborhood nodes layer 630), core network or routers (e.g., at a regional or central office layer 620), and internet/cloud servers at a global layer 610. A fog network (e.g., established at the gateway layer 640) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE core network), among others. In this context, FIG. 6 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a mobile edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., execution of functions) in a low-latency manner, and, in some embodiments, may utilize features in existing MEC services that provide minimal overhead.

EXAMPLES

Illustrative examples of the technologies disclosed herein are provided below. An embodiment of the technologies may include any one or more, and any combination of, the examples described below.

Example 1 includes a device comprising circuitry to identify a function of an application to be accelerated; determine one or more properties of an accelerator resource available at the edge of a network where the device is located; determine one or more properties of an accelerator resource available in the device; determine a set of acceleration selection factors associated with the function, wherein the acceleration factors are indicative of one or more objectives to be satisfied in the acceleration of the function; and select, as a function of the one or more properties of the accelerator resource available at the edge, the one or more properties of the accelerator resource available in the device, and the acceleration selection factors, one or more of the accelerator resources to accelerate the function.

Example 2 includes the subject matter of Example 1, and wherein the circuitry is further to provide, to the one or more selected accelerator resources, the function.

Example 3 includes the subject matter of any of Examples 1 and 2, and wherein to determine one or more properties of an accelerator resource available at the edge comprises to determine a power usage of the accelerator resource.

Example 4 includes the subject matter of any of Examples 1-3, and wherein to determine one or more properties of an accelerator resource available at the edge comprises to determine a latency of the accelerator resource.

Example 5 includes the subject matter of any of Examples 1-4, and wherein to determine the latency comprises to determine the latency as a function of a type of the accelerator resource and a type of the function to be accelerated.

Example 6 includes the subject matter of any of Examples 1-5, and wherein to determine the latency comprises to determine the latency as a function of a present load on the accelerator device.

Example 7 includes the subject matter of any of Examples 1-6, and wherein to determine the latency comprises to determine the latency as a function of an amount of congestion on a communication path to the accelerator resource.

Example 8 includes the subject matter of any of Examples 1-7, and wherein to determine one or more properties of an accelerator resource available at the edge comprises to determine a monetary cost to utilize the accelerator resource.

Example 9 includes the subject matter of any of Examples 1-8, and wherein to determine one or more properties of an accelerator resource available at the edge comprises to determine one or more security features of the accelerator resource.

Example 10 includes the subject matter of any of Examples 1-9, and wherein to determine one or more properties of an accelerator resource of the device comprises to determine at least one of a power usage of the accelerator resource, a latency for the accelerator resource, a monetary cost to utilize the accelerator resource, or a security feature of the accelerator resource.

Example 11 includes the subject matter of any of Examples 1-10, and wherein to determine a set of acceleration selection factors comprises to determine the set of acceleration factors from a service level agreement (SLA) associated with the application.

Example 12 includes the subject matter of any of Examples 1-11, and wherein to determine a set of acceleration selection factors comprises to determine the set of acceleration factors as a function of a present status of the device.

Example 13 includes the subject matter of any of Examples 1-12, and wherein to determine a set of acceleration selection factors as a function of a present status of the device comprises to determine a present amount of energy available in a battery of the device.

Example 14 includes the subject matter of any of Examples 1-13, and wherein to determine a set of acceleration selection factors as a function of a present status of the device comprises to determine a strength of a wireless signal to a device at the edge.

Example 15 includes the subject matter of any of Examples 1-14, and wherein to determine a set of acceleration selection factors comprises to determine at least one of a target power usage, a target latency, a target monetary cost, and a target security feature.

Example 16 includes the subject matter of any of Examples 1-15, and wherein to select one or more of the accelerator resources to accelerate the function comprises to select multiple accelerator resources to accelerate the function concurrently.

Example 17 includes the subject matter of any of Examples 1-16, and wherein to identify the function to be accelerated comprises to receive an application programming interface (API) call from the application to accelerate the function.

Example 18 includes a method comprising identifying, by a device, a function of an application to be accelerated; determining, by the device, one or more properties of an accelerator resource available at the edge of a network where the device is located; determining, by the device, one or more properties of an accelerator resource available in the device; determining, by the device, a set of acceleration selection factors associated with the function, wherein the acceleration factors are indicative of one or more objectives to be satisfied in the acceleration of the function; and selecting, by the device and as a function of the one or more properties of the accelerator resource available at the edge, the one or more properties of the accelerator resource available in the device, and the acceleration selection factors, one or more of the accelerator resources to accelerate the function.

Example 19 includes the subject matter of Example 18, and further including providing, by the device and to the one or more selected accelerator resources, the function.

Example 20 includes one or more machine-readable storage media comprising a plurality of instructions stored thereon that, in response to being executed, cause a device to identify a function of an application to be accelerated; determine one or more properties of an accelerator resource available at the edge of a network where the device is located; determine one or more properties of an accelerator resource available in the device; determine a set of acceleration selection factors associated with the function, wherein the acceleration factors are indicative of one or more objectives to be satisfied in the acceleration of the function; and select, as a function of the one or more properties of the accelerator resource available at the edge, the one or more properties of the accelerator resource available in the device, and the acceleration selection factors, one or more of the accelerator resources to accelerate the function.

Example 21 includes one or more machine-readable storage media comprising a plurality of instructions stored thereon that, after being prepared for execution, cause a device that executes the prepared instructions to identify a function of an application to be accelerated; determine one or more properties of an accelerator resource available at the edge of a network where the device is located; determine one or more properties of an accelerator resource available in the device; determine a set of acceleration selection factors associated with the function, wherein the acceleration factors are indicative of one or more objectives to be satisfied in the acceleration of the function; and select, as a function of the one or more properties of the accelerator resource available at the edge, the one or more properties of the accelerator resource available in the device, and the acceleration selection factors, one or more of the accelerator resources to accelerate the function.

What is claimed is:

1. One or more storage devices or storage disks comprising first instructions to cause at least one processor to:
   determine first device type property information of a first accelerator of a first device;
   determine second device type property information of a second accelerator of a second device;
   partition second instructions into a first portion and a second portion, the partitioning capable of being based on (a) a first latency associated with processing the first portion of the second instructions with the first accelerator of the first device, (b) a second latency associated with processing the second portion of the second instructions with the second accelerator of the second device, (c) the first device type property information of the first accelerator of the first device, and (d) the second device type property information of the second accelerator of the second device;
   provide the first portion of the second instructions to the first accelerator of the first device; and
   provide the second portion of the second instructions to the second accelerator of the second device.

2. The one or more storage devices or storage disks of claim 1, wherein the at least one processor is to partition the second instructions into the first portion and the second portion based at least one of a first communication path of the first accelerator or a second communication path of the second accelerator.

3. The one or more storage devices or storage disks of claim 1, wherein the at least one processor is to determine an objective to be satisfied by acceleration of the second instructions, the objective associated with the first latency associated with processing the first portion of the second instructions with the first accelerator and the second latency associated with processing the second portion of the second instructions with the second accelerator.

4. The one or more storage devices or storage disks of claim 1, wherein the at least one processor is the at least one processor of a server.

5. The one or more storage devices or storage disks of claim 1, wherein to determine the first latency associated with processing the first portion of the second instructions with the first accelerator, and the at least one processor is to measure a present load on the first accelerator.

6. The one or more storage devices or storage disks of claim 1, wherein the first device type property information and the second device type property information are equivalent.

7. One or more storage devices or storage disks comprising first instructions to cause at least one processor to, at least:
   determine first device type property information of a first accelerator of a first device;
   determine second device type property information of a second accelerator of a second device;
   partition second instructions into a first portion and a second portion, the partitioning capable of being based on (a) a first latency associated with processing the first portion of the second instructions with the first accelerator of the first device, (b) a second latency associated with processing the second portion of the second instructions with the second accelerator of the second device, (c) the first device type property information of the first accelerator of the first device, and (d) the second device type property information of the second accelerator of the second device; and
   cause transmission of at least one of the first portion or the second portion of the second instructions based on the partitioning.

8. The one or more storage devices or storage disks of claim 7, wherein the at least one processor is to:
   output the first portion of the second instructions to the first accelerator of the first device; and
   output the second portion of the second instructions to the second accelerator of the second device.

9. The one or more storage devices or storage disks of claim 7, wherein the at least one processor is to partition the second instructions into the first portion and the second portion based on at least one of a first communication path of the first accelerator or a second communication path of the second accelerator.

10. The one or more storage devices or storage disks of claim 7, wherein the at least one processor is to determine an objective to be satisfied by acceleration of the second instructions, the objective associated with the first latency associated with processing the first portion of the second instructions with the first accelerator and the second latency associated with processing the second portion of the second instructions with the second accelerator.

11. The one or more storage devices or storage disks of claim 7, wherein the at least one processor is the at least one processor of a server.

12. The one or more storage devices or storage disks of claim 7, wherein to determine the first latency associated with processing the first portion of the second instructions with the first accelerator, and the at least one processor is to measure a present load on the first accelerator.

13. The one or more storage devices or storage disks of claim 7, wherein the first device type property information and the second device type property information are equivalent.

14. A method comprising:
   determining, by executing an instruction with at least one processor, first device type property information of a first accelerator of a first device;
   determining, by executing an instruction with the at least one processor, second device type property information of a second accelerator of a second device;
   partitioning, by executing an instruction with the at least one processor, first instructions into a first portion and a second portion, the partitioning capable of being based on (a) a first latency associated with processing the first portion of the first instructions with the first accelerator of the first device, (b) a second latency associated with processing the second portion of the first instructions with the second accelerator of the second device, (c) the first device type property information of the first accelerator of the first device, and (d) the second device type property information of the second accelerator of the second device;
   outputting, by executing an instruction with the at least one processor, the first portion of the first instructions to the first accelerator of the first device; and
   outputting, by executing an instruction with the at least one processor, the second portion of the first instructions to the second accelerator of the second device.

15. The method of claim 14, wherein the method further includes partitioning the first instructions into the first portion and the second portion based on at least one of a first communication path of the first accelerator or a second communication path of the second accelerator.

16. The method of claim 14, further including determining an objective to be satisfied by acceleration of the first instructions, the objective associated with the first latency associated with processing the first portion of the first instructions with the first accelerator and the second latency associated with processing the second portion of the first instructions with the second accelerator.

17. The method of claim 14, wherein the at least one processor is the at least one processor of a server.

18. The method of claim 14, further including determining the first latency associated with processing the first portion of the first instructions with the first accelerator by measuring a present load on the first accelerator.

19. The method of claim 14, wherein the first device type property information and the second device type property information are equivalent.

20. An apparatus comprising:
   at least one memory;
   first instructions; and
   at least one processor to execute the first instructions to:
      determine first device type property information of a first accelerator of a first device;
      determine second device type property information of a second accelerator of a second device;
      partition second instructions into a first portion and a second portion, the partitioning capable of being based on (a) a first latency associated with processing the first portion of the second instructions with the first accelerator of the first device, (b) a second latency associated with processing the second portion of the second instructions with the second accelerator of the second device, (c) the first device type property information of the first accelerator of the first device, and (d) the second device type property information of the second accelerator of the second device;
      delegate the first portion of the second instructions to the first accelerator of the first device; and
      delegate the second portion of the second instructions to the second accelerator of the second device.

21. The apparatus of claim 20, wherein the at least one processor is to partition the second instructions into the first portion and the second portion based on at least one of a first communication path of the first accelerator or a second communication path of the second accelerator.

22. The apparatus of claim 20, wherein the at least one processor is to determine an objective to be satisfied by acceleration of the second instructions, the objective associated with the first latency associated with processing the first portion of the second instructions with the first accelerator and the second latency associated with processing the second portion of the second instructions with the second accelerator.

23. The apparatus of claim 20, wherein the at least one processor is the at least one processor of a server.

24. The apparatus of claim 20, wherein to determine the first latency associated with processing the first portion of the second instructions with the first accelerator, the at least one processor is to measure a present load on the first accelerator.

25. The apparatus of claim 20, wherein the first device type property information and the second device type property information are equivalent.

* * * * *